(12) United States Patent
Hawker et al.

(10) Patent No.: US 7,551,942 B2
(45) Date of Patent: Jun. 23, 2009

(54) HEARING AID COMPATIBILITY IN A WIRELESS COMMUNICATIONS DEVICE

(75) Inventors: Larry Edward Hawker, Waterloo (CA); Scott MacIntosh, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 46 days.

(21) Appl. No.: 10/902,155

(22) Filed: Jul. 30, 2004

(65) Prior Publication Data

US 2006/0025172 A1    Feb. 2, 2006

(51) Int. Cl.
*H04M 1/00* (2006.01)
*H04B 1/38* (2006.01)

(52) U.S. Cl. ............ 455/556.1; 455/575.1; 455/575.2; 455/550.1; 455/90.3; 455/569.1; 381/331; 381/312

(58) Field of Classification Search .............. 455/556.1, 455/90.1, 344–346, 550.1, 66.1, 575.2, 569.1; 381/314, 322, 323, 72, 74, 331, 312
See application file for complete search history.

(56) References Cited

U.S. PATENT DOCUMENTS

| | | | | |
|---|---|---|---|---|
| 6,157,727 | A * | 12/2000 | Rueda | 381/312 |
| 6,895,345 | B2 * | 5/2005 | Bye et al. | 702/57 |
| 7,106,874 | B2 * | 9/2006 | Wieczorek et al. | 381/331 |
| 2003/0059076 | A1 * | 3/2003 | Martin | 381/331 |
| 2003/0223592 | A1 * | 12/2003 | Deruginsky et al. | 381/92 |
| 2004/0247145 | A1 * | 12/2004 | Luo et al. | 381/312 |
| 2005/0090295 | A1 * | 4/2005 | Ali et al. | 455/575.2 |
| 2005/0260985 | A1 * | 11/2005 | Rader et al. | 455/432.3 |
| 2005/0288057 | A1 * | 12/2005 | Lai et al. | 455/556.1 |

OTHER PUBLICATIONS 2 pages from website "http://www.parkerhearing.com/starkey.html".
Berger, Stephen, TEM Consulting, "Overview of ANSI C63.19—Wireless Hearing Aid Compatibility", Presentation to ATIS HAC Incubator, copyright 2003, TEM Consulting, LP.

* cited by examiner

*Primary Examiner*—Charles N Appiah
*Assistant Examiner*—Emem Stephen
(74) *Attorney, Agent, or Firm*—Bereskin & Parr LLP

(57) ABSTRACT

A wireless communications device and method for providing an output signal The device includes a control unit for controlling the operation of the wireless communications device; a selection element connected to the control unit and configured to allow selection of several modes of output coupling for generating the output signal of the device; and, a processor connected to the control unit for processing a received signal with parameters selected according to selected mode of output coupling. The several modes of output coupling correspond to several modes of input operation for a hearing aid to improve coupling between the device and the hearing aid.

16 Claims, 6 Drawing Sheets

HEARING AID COMPATIBILITY IN A WIRELESS COMMUNICATIONS DEVICE

FIELD OF THE INVENTION

The invention relates to a system and method for ensuring that a wireless communications device provides sufficient audio and magnetic coupling to a hearing aid user who uses the device.

BACKGROUND OF THE INVENTION

The Federal Communications Commission (FCC) has recently ruled that wireless communications devices are no longer exempt from the hearing aid compatibility magnetic coupling requirements of the Americans with Disabilities Act. This requires that a wireless communciations device produce a magnetic field with a specified strength and frequency response which can be detected by the telecoil of a hearing aid. This is in addition to the requirement that a wireless communications device produce an audio signal having a specified strength and frequency response which can be detected by the microphone of a hearing aid.

Traditional desktop telephone handsets use dynamic receivers that, with minimal acoustic design, are able to provide a nominally flat audio frequency response as required by the relevant specifications. The inherently flat magnetic field generated by the receiver also makes it relatively easy to meet the required magnetic frequency response. If the level of the magnetic field is insufficient (or completely absent as with piezoelectric receivers) then an additional device telecoil may be used as is commonly known to those skilled in the art. This additional telecoil may be included as an integral part of the receiver or implemented separately.

However, the smaller size of the newer wireless communications devices and the acoustic design changes that are necessary for good audio performance frequently make it difficult and sometimes impossible to simultaneously meet both the audio and magnetic specifications (particularly the frequency response) even with an additional telecoil. Frequently, the wireless communications device must rely on equalization (EQ) of the electrical signal that corresponds to the output audio signal, usually using a digital signal processor (DSP), to meet the audio frequency response requirements. This same EQ directly affects the signal creating the magnetic field and may cause the wireless communications device to fail the magnetic frequency response requirements. This is the case regardless of whether or not there is an additional telecoil because the same drive signal is used to drive both the speaker and the additional telecoil.

SUMMARY OF THE INVENTION

The inventors have developed a system and method for a wireless communications device to meet both audio and magnetic specifications so that the wireless communications device provides sufficient signal coupling to a hearing aid regardless of whether the hearing aid is operating in microphone or telecoil mode.

In one aspect, at least one embodiment of the invention provides a wireless communications device for receiving a wireless speech signal and providing an output signal aid. The device comprises a control unit for controlling the operation of the wireless communications device; a selection means connected to the control unit and configured to allow selection of several modes of output coupling for generating the output signal of the device; a communication subsystem connected to the control unit for receiving the wireless speech signal and producing a received signal; a processor connected to the control unit for receiving the received signal and producing a processed received signal, the processor using parameters to generate the processed received signal according to a selected coupling mode; and, an output stage configured to generate the output signal based on the processed received signal. The several modes of output coupling correspond to several modes of input operation for a hearing aid to improve coupling between the device and the hearing aid.

The coupling mode may be one of microphone mode, telecoil mode and microphone/telecoil mode.

The parameters may include acoustic parameters when the coupling mode is the microphone mode. Alternatively, the parameters may include magnetic parameters when the coupling mode is the telecoil mode. In another alternative, the parameters may include acoustic/magnetic parameters when the coupling mode is the microphone/telecoil mode.

The device may further include a data converter connected to the processor for receiving the processed received signal and producing an analog signal; and the output stage is connected to the data converter for receiving the analog signal and producing the output signal.

The output stage may include a speaker.

Alternatively, the output stage may include a speaker and an additional device telecoil, and the processor generates two processed received signals, each being provided to one of the speaker and the additional device telecoil by the data converter, and each being generated using parameters corresponding to one of the speaker and the additional device telecoil, the speaker being driven to generate the output signal in the microphone and microphone/telecoil modes.

In another alternative, the output stage may include a switch means, a speaker and an additional device telecoil, the input of the switch means being connected to the data converter and the outputs of the switch means being connected to the speaker and the additional device telecoil coil, the speaker being driven to generate the output signal in the microphone and microphone/telecoil modes.

The additional device telecoil may also be driven to generate the output signal in the microphone/telecoil mode.

The additional device telecoil may be driven to generate the output signal in the telecoil mode and the speaker is disabled.

The method includes providing acoustic parameters as the

In another aspect, at least one embodiment of the invention provides a method for receiving a wireless speech signal with a device and providing an output signal, the method comprising:

a) providing several different modes of output coupling for the device, the several modes of output coupling corresponding to several modes of input operation for a hearing aid to improve coupling between the device and the hearing aid;

b) receiving the wireless speech signal and producing a received signal;

c) generating a processed received signal using parameters selected according to a selected mode of output coupling; and, d) generating the output signal based on the processed received signal. parameters when the coupling mode is the microphone mode. Alternatively, the method includes providing magnetic parameters as the parameters when the coupling mode is the telecoil mode. In another alternative, the method includes providing acoustic/magnetic parameters as the parameters when the coupling mode is the microphone/telecoil mode.

Step (d) of the method may include:

a) receiving the processed received signal and producing an analog signal; and, b) receiving the analog signal and producing the output signal.

The method may include providing a speaker for generating the output signal.

Alternatively, the method may include providing a speaker and an additional device telecoil for generating the output signal, and step (c) includes generating two processed received signals, each being provided to one of the speaker and the additional device telecoil, and each being generated using parameters corresponding to one of the speaker and the additional device telecoil, the speaker being driven to generate the output signal in the microphone and microphone/telecoil modes.

In another alternative, the method may include providing a switch means, a speaker and an additional device telecoil for generating the output signal, and driving the speaker to generate the output signal in the microphone and microphone/telecoil modes.

The method may further include also driving the additional device telecoil to generate the output signal in the microphone/telecoil mode.

The method may further include driving the additional device telecoil to generate the output signal in the telecoil mode and disabling the speaker.

In yet another aspect, at least one embodiment of the invention provides a wireless communications device The device comprises a control unit for controlling the operation of the wireless communications device; a selection means connected to the control unit and configured to allow selection of a mode of output coupling for generating an output signal of the device; a processor connected to the control unit for processing a received signal with parameters selected according to a selected mode of output coupling; and an output stage configured to generate the output signal based on the processed received signal. The selection means is configured to enable selection of one of a telecoil mode and a microphone/telecoil mode as the mode of output coupling.

The selection means can also enable selection of a microphone mode and the parameters may include acoustic DSP EQ parameters when the coupling mode is the microphone mode. Alternatively, the parameters may include magnetic DSP EQ parameters when the coupling mode is the telecoil mode. In another alternative, the parameters may include acoustic/magnetic DSP EQ parameters when the coupling mode is the microphone/telecoil mode.

BRIEF DESCRIPTION OF THE DRAWINGS

For a better understanding of the invention and to show more clearly how it may be carried into effect, reference will now be made, by way of example only, to the accompanying drawings which show at least one exemplary embodiment of the invention and in which.

DETAILED DESCRIPTION OF THE INVENTION

Figure 1:
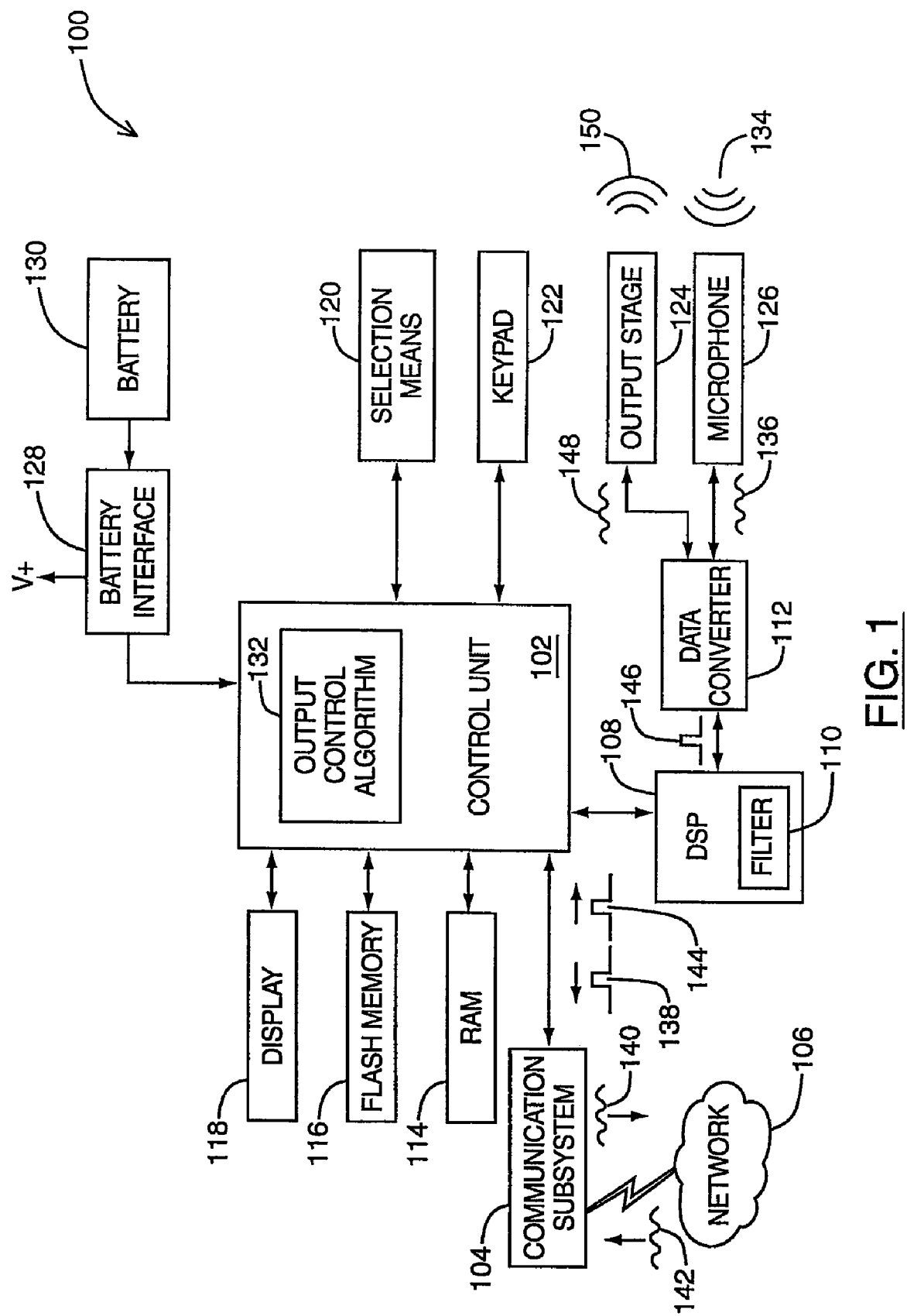
FIG. 1 is a block diagram of an exemplary embodiment of a wireless communications device in accordance with the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements. In addition, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention.

Referring now to FIG. 1, shown therein is a block diagram of an exemplary embodiment of a wireless communications device 100 in accordance with the invention. The wireless communications device 100 is a two-way communications device with advanced data communication capabilities having the capability to communicate with other devices such as cell phones or computer systems for example. Accordingly, the wireless communications device 100 includes the capability for voice communications and may also include the capability for various other types of data communication. Depending on the functionality provided by the wireless communications device 100, it may be a cellular telephone with data messaging capabilities, or a data communications device with telephony capabilities. Alternatively, the wireless communications device 100 may be a telephone, cordless telephone, cellular phone, voice-enabled personal digital assistant or any device providing electronic voice communications. An alternative voice or audio I/O subsystem, such as a voice message recording subsystem, may also be implemented on the wireless communications device 100.

The wireless communications device 100 may communicate with other devices through a network of transceiver stations. The user of the wireless communications device 100 can establish a call with another person who uses another device that can communicate with the wireless communications device 100. The other person may be using a device connected to a public-switched telephone network (PSTN) or a cellular network (both not shown). Alternatively, the other device may be a voice mail system.

The wireless communications device 100 comprises a number of components including a control unit 102. The control unit 102 controls the overall operation of the wireless communications device 100. The control unit 102 may be a microprocessor or a microcontroller. Any commercially available microcontroller, such as a microcontroller available from ARM, Motorola, Intel, and the like may be used for the control unit 102.

Communication functions, including voice and possibly data communications, are performed through a communication subsystem 104. The communication subsystem 104 receives messages from and sends messages to a wireless network 106. In an embodiment of the invention, the communication subsystem 106 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). It should be understood that the invention is compatible with any other suitable standard that is developed in the future. The wireless link connecting the communication subsystem 104 with the network 106 represents one or more different Radio Frequency (RF) channels, operating according to defined protocols specified for GSM/GPRS communications. With newer network protocols, these channels are capable of supporting both circuit switched voice communications and packet switched data communications.

The control unit 102 interacts with a number of subsystems such as a digital signal processor (DSP) 108. The DSP 108 includes at least one digital filter 110 and interacts with a data converter 112. The DSP 108 may be commercially available from various manufacturers, including Texas Instruments of Austin, Tex., U.S.A. and Analog Devices of Norwood, Mass., U.S.A. The digital filter 110 may be a finite impulse response filter or an infinite impulse response filter. Coefficients for the digital filter 110 may be defined based on the desired audio performance for the wireless communications device 100 as well as the hardware associated with the wireless communications device 100 such as the speaker that is used. Various sets of coefficients may be used depending on the settings applied to the wireless communications device 100. The coefficients may be stored in non-volatile memory and accessed by the control unit 102.

The control unit 102 also interacts with a Random Access Memory (RAM) 114, a flash memory 116, a display 118, a selection means 120, and a keypad 122. Other types of non-volatile storage devices known in the art may be used rather than the flash memory 116. The keypad 122 may be a telephone-type keypad, an alphanumeric keyboard or some other suitable keypad. The control unit 102 has access to the memory units 114 and 116 to store routines, variables and data used by various algorithms executed by the control unit 102.

The data converter 112 interacts with an output stage 124 and a microphone 126. The data converter may be a digital-to-analog converter or it may be a codec. A codec is a device or software program that can be used to transform data or signals. A representative codec or digital-to-analog converter is commercially available from Texas Instruments of Austin, Tex., U.S.A and Analog Devices of Norwood, Mass., U.S.A. The output stage 124 may be a speaker that produces audible signals if a voice data signal was received by the wireless communications device 100. In other embodiments, the output stage 124 may also include an additional device telecoil as will be described in further detail below. The microphone 126 receives all audio signals from the user as the user speaks into the wireless communications device 100. The speaker may be any type of speaker having appropriate dimensions and performance characteristics to produce an audio signal for the wireless communications device 100. A representative speaker is commercially available from Philips Sound Solutions of Vienna, Austria and Foster Electric Co. of Tokyo, Japan. The microphone 126 may be any type of microphone having appropriate dimensions and performance characteristics to receive an audio signal from the device user. A representative microphone is commercially available from Panasonic of Seacacus, N.J., U.S.A. and Knowles Acoustics of Itasca, Ill., U.S.A. Although voice or audio signal output is accomplished primarily through the output stage 124, the display 118 may also be used to provide additional information such as the identity of a calling party, duration of a voice call, or other voice call related information.

The wireless communications device 100 is a battery-powered device. Accordingly, the control unit 102 interacts with a battery interface 128 that is connected to one or more rechargeable batteries 130. The battery interface 128 is coupled to a regulator (not shown) that regulates the voltage obtained from the battery 130 to provide relatively constant supply power V+ to the wireless communications device 100. Although current technology makes use of a battery, future technologies such as micro fuel cells may provide the power to wireless communications device 100.

An output control algorithm 132, stored on the flash memory 116, is executed by the control unit 102 to vary the operating parameters of the DSP 108 due to information received from the selection means 120 as will be described in more detail below. The control unit 102 also executes other algorithms to operate the wireless communications device 100 such as algorithms for providing control for many operations of wireless communications device 100, including call control, display control and power management.

Some of the subsystems of the wireless communications device 100 perform communication-related functions, whereas other subsystems may provide "resident" or on-device functions. By way of example, the display 118 and the keypad 122 may be used for both communication-related functions, such as entering a text message for transmission over the network 106 or configuring the wireless communications device 100 for operating in a certain mode when receiving an incoming telephone call. Alternatively, the display 118 and the keypad 122 may be used for device-resident functions such as a calculator or task list operation. The operating system software that is used by the control unit 102 is typically stored in a persistent store such as the flash memory 116, which may alternatively be a read-only memory (ROM) or a similar storage element (not shown). Those skilled in the art will appreciate that the operating system, specific device applications, or parts thereof, may be temporarily loaded into a volatile store such as the RAM 114.

The communication subsystem 104 is a conventional communications module. In an embodiment of the invention, the communication system 104 may include a receiver, a transmitter, one or more embedded or internal antenna elements, local oscillators, and a communications processing module (all not shown). The connection of these elements to one another is well known to those skilled in the art. The particular design of the communication subsystem 104 is dependent upon the network 106 in which the wireless communications device 100 is intended to operate. The receiver may perform such common receiver functions as signal amplification, frequency down conversion, filtering, channel selection, and analog-to-digital (A/D) conversion. A/D conversion of a received signal allows more complex communication functions such as demodulation and decoding to be performed in the communications processing module. In a similar manner, signals to be transmitted undergo appropriate processing, such as modulation and encoding, in the communications processing module. These processed signals are then input to the transmitter for digital-to-analog (D/A) conversion, frequency up conversion, filtering, amplification and transmission over the network 106 via the internal antenna elements. The communications processor not only processes communication signals, but also provides for receiver and transmitter control. For example, the gains applied to the communication signals in the receiver and transmitter may be adaptively controlled through automatic gain control algorithms implemented in the communications processing module.

The wireless link between the wireless communications device 100 and the network 106 may contain one or more different channels, typically different radio frequency (RF) channels, and associated protocols are used between the wireless communications device 100 and the network 106. An RF channel is a limited resource that must be conserved, typically due to limits in overall bandwidth and limited battery power of the wireless communications device 100. When the wireless communications device 100 is fully operational, the transmitter in the communications subsystem 104 is typically keyed or turned on only when it is sending data to the network 106 and is otherwise turned off to conserve resources. Similarly, the receiver in the communications subsystem 104 is periodically turned off to conserve power until it is needed to receive signals or information (if at all) during the designated time periods.

The wireless communications device 100 may send and receive communication signals over the network 106 after required network registration or activation procedures have been completed. The network access is associated with a subscriber or user of the wireless communications device 100. To identify a subscriber, the wireless communications device 100 may include other suitable hardware, such as a subscriber identity module, as is commonly known to those skilled in the art. Additional optional services that could be provided by the wireless communications device 100 include web browsing and messaging such as email, voice mail, Short Message Service (SMS), and Multimedia Messaging Services (MMS). More advanced services may include point of sale, field service and sales force automation.

The control unit 102, in addition to its operating system functions, enables execution of software applications on the wireless communications device 100. A set of applications which control basic device operations, including voice communication applications, will normally be installed on the wireless communications device 100 during its manufacture. Additional applications may also be loaded onto the wireless communications device 100 through the network 106 or any other suitable communications subsystem. This flexibility in application installation increases the functionality of the wireless communications device 100 and may provide enhanced on-device functions, communication-related functions, or both. For example, secure communication applications may enable electronic commerce functions and other such financial transactions to be performed using the wireless communications device 100.

In use, when the wireless communications device 100 is being used as a cellular phone and the user speaks, a speech signal 134 is transduced by the microphone 126 into an electrical speech signal 136, converted by the data converter 112 and processed by the DSP 108 to produce a processed speech signal 138. The control unit 102 then routes the processed speech signal 138 to the communication subsystem 104 which generates a speech transmission signal 140 for transmission over the network 106.

The other situation that occurs when the wireless communications device 100 is being used as a cellular phone is that the user receives a speech signal from another device over the network 106. In this case, a received signal 142 is processed by the communications subsystem 104 to produce a digital received signal 144 which is routed to the DSP 108 by the control unit 102. The DSP 108 processes the digital received signal 144 to produce a processed received signal 146. The data converter 112 then converts the processed received signal 146 into a corresponding analog or drive signal 148 that is then fed to the output stage 124 which generates a corresponding output signal 150.

Various adjustments may be applied to the digital received signal 144 by the DSP 108 including a change in volume, pitch and frequency. This may be achieved by selecting appropriate filter coefficients for the filter 110 which are applied to the digital received signal 144. The filter coefficients are preferably provided by the control unit 102 as another set of inputs to the DSP 108. With all of the input and coefficient information, the DSP 108 uses its internal specialized DSP circuits to efficiently generate the processed received signal 146. The selection and application of various coefficients for the filter 110 is described in more detail in U.S. patent application Ser. No. 10/855,407 which was filed on May 28, 2004 and is hereby incorporated by reference.

However, increasing the volume of the acoustic output signal 150 past a certain threshold level, which is frequency dependent, introduces distortion into the audio component of the output signal 150, thereby affecting audio quality and making it difficult for the user to understand. Further, the digital received signal 144 may be processed so that the resulting output signal 150 satisfies certain performance requirements. In addition, the user of the device 100 may be a hearing aid user and further processing may be performed on the digital received signal 146 so that the output signal 150 is better understood by the hearing aid user. Accordingly, the DSP 108 may implement a number of signal processing algorithms to process the digital received signal 144.

Figure 2:
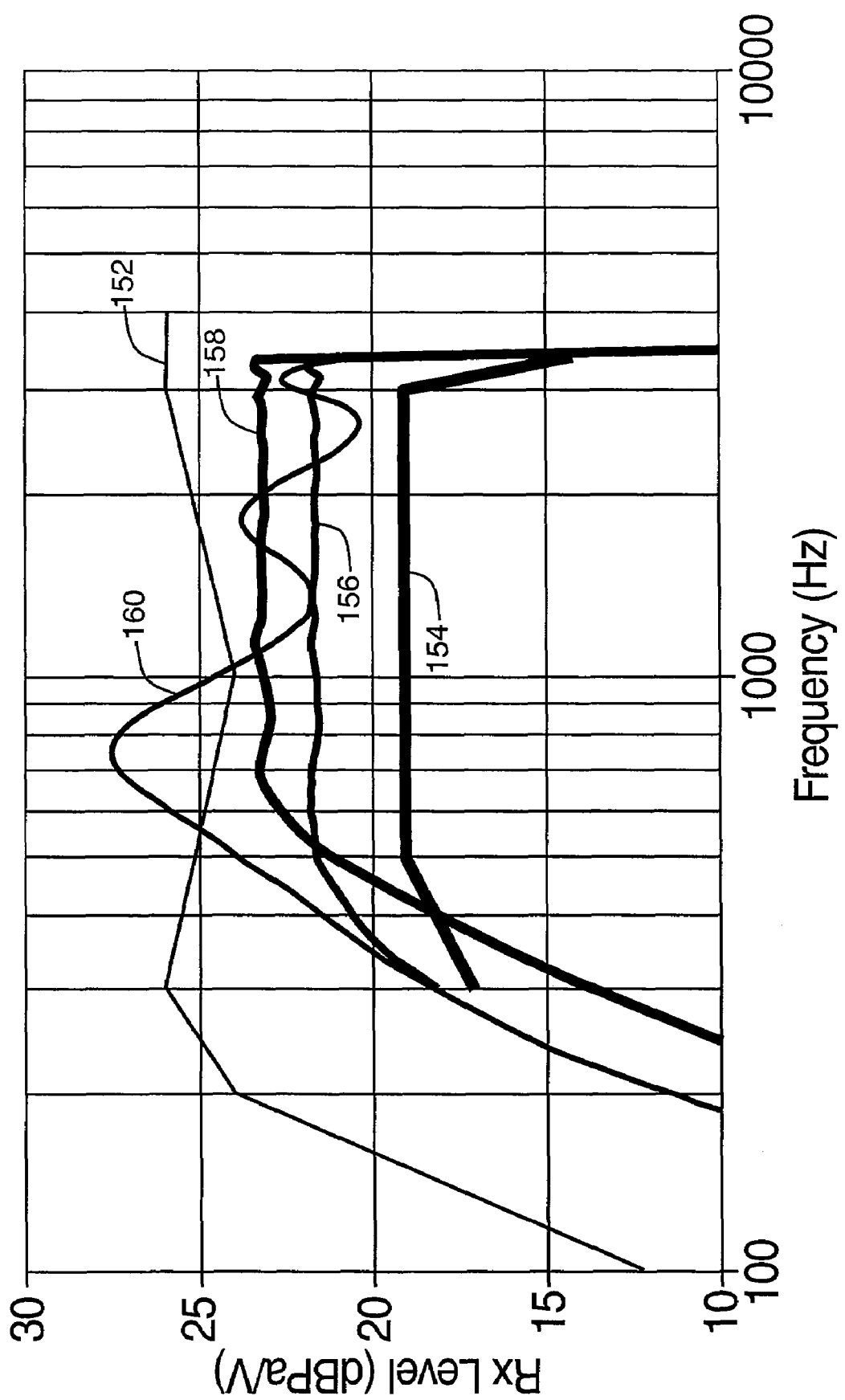
FIG. 2 is a graph showing various frequency response curves for selected output levels of the acoustic component of the output signal produced by the wireless communications device.

In the current regulatory environment, cellular phones and other wireless communication devices, such as device 100, must generally meet minimal operating performance specifications relating to the quality of the produced acoustic output signals. Such audio specifications include signal frequency response and loudness rating standards. Referring now to FIG. 2, shown therein is a graph showing various frequency response curves for selected output levels of acoustic output signals that may be produced by the wireless communications device 100. The Global Systems Mobile (GSM) standards dictates that, for a communications device operating at the nominal volume setting, the frequency response of the produced acoustic output signal 150 must fall between a floating template defined by upper boundary 152 and lower boundary 154. The loudness standard is known as a Receive Loudness Rating.

Frequency response curves 156, 158 and 160 are exemplary responses generated by the output stage 124. Each curve represents the output stage 124 being driven at a given output level with different filter coefficients being applied to the filter 110. The frequency response curve 160 is the acoustic frequency response of the output stage 124 with no filtering (i.e. with a flat filter response). The frequency response curve 156 is the acoustic frequency response of the output stage 124 with filter coefficients applied for a nominal volume setting to provide compliance with the frequency response specification. The frequency response curve 158 is the acoustic frequency response of the output stage 124 for a different set of filter coefficients. This compensation, from one frequency response to another, ensures that the user experiences the expected change in loudness, as determined by the Receive Loudness Rating, when the volume setting is switched from one volume level to another volume level and when the coefficients applied to the filter 110 are switched.

While it is generally understood that the output signal 150 includes an acoustic component and that the requirements for the output signal 150 are usually specified in terms of acoustic properties, the output signal 150 also includes a magnetic component. The output stage 124 typically includes a speaker having a coil and a diaphragm (both not shown). As is known by those skilled in the art, the drive signal 148 is applied to the coil which produces a magnetic signal that displaces the diaphragm in such a manner to create the desired acoustic output. Accordingly, the output signal 150 includes both acoustic and magnetic signal components.

As mentioned previously, the user of the wireless communications device 100 may use a hearing aid. Some hearing aids are provided not only with a microphone input but also with a telecoil input. Accordingly, the hearing aid may be operated in microphone (M) mode, telecoil (T) mode or a combination microphone and telecoil (M/T) mode. Each of these modes determines the fashion in which the output signal 150 is coupled to the hearing aid. In M mode, the acoustic component of the output signal 150 is detected by the microphone of the hearing aid and the telecoil input is disabled. In T mode, the magnetic component of the output signal 150 is detected by the telecoil input of the hearing aid and the microphone is disabled. This is beneficial for preventing acoustic feedback and providing better performance in noisy environments. In M/T mode, both the microphone and the telecoil inputs are active. The microphone input may be attenuated to prevent feedback but still allow the user to hear his/her own voice and to also be aware of the surrounding environment.

The processing, which may be referred to as DSP EQ, that is applied to the digital received signal 142 affects both the acoustic and magnetic components of the output signal 150. The DSP EQ largely consists of specifying gain values versus frequency. Furthermore, as is commonly known to those skilled in the art, the DSP EQ is typically implemented so that only the acoustic component of the output signal 150 meets certain requirements while disregarding the effect on the magnetic component of the output signal 150. The magnetic response of the speaker is typically flat across the frequencies of interest. Accordingly, when the speaker is driven with a flat signal, the magnetic component of the output signal is flat. However, when the device is operating in M mode, the drive signal is modified by the DSP EQ required to meet a desired audio specification. The resultant magnetic component of the output signal 150 closely follows the DSP EQ and any other electronic effects in the audio path. Consequently, in some cases, the magnetic component of the output signal 150 may not be sufficient to provide adequate coupling with the hearing aid when the hearing aid is operating in T mode or M/T mode.

In accordance with the invention, the user may specify the mode of output coupling for the wireless communications device 100 with the selection means 120. For example, when a call is answered or originated, the user has the option of selecting the type of output coupling which affects the processing applied by the DSP 108. In particular, the device 100 may be operated in M, T, or M/T coupling mode depending on the input mode of operation for the hearing aid.

The selection means 120 may be a slide switch on the wireless communications device 100 with three settings: M, T and M/T. Alternatively, the selection means 120 may be a separate button or a button on the keypad 122 that, when depressed, switches between the M, T and M/T modes of operation. In another alternative, the selection means 120 may be a portion of a touch sensitive screen that is part of the display 118. In a further alternative, the selection means 120 may be a thumb wheel that the user uses to scroll across a variety of options and depresses to select a particular mode of operation. A default mode may be specified, either during the manufacture of the wireless communications device 100 or upon first use. In a further alternative, the user may be presented with a phone screen on the display 118 when a call is received/originated and the user may select the appropriate coupling mode by actuating the selection means 120.

In M coupling mode, the dominant mode of coupling is acoustic and the DSP 108 applies acoustic DSP EQ to optimize the acoustic component of the output signal 150 as it conventionally does. The natural acoustic response of the device 100 is dependent on the characteristics of the speaker and the acoustic design implementation, i.e. the size of the front and back cavities, the quality of acoustic seals, the number and size (i.e. length and diameter) of acoustic ports (holes), etc. However, the wireless communications device 100 preferably complies with a standard audio specification which specifies certain criteria for audio sensitivity and frequency response as well as noise and distortion specifications. The chosen specification may also depend on the interface of the communications subsystem 104 to the network 106 which may be the Global System for Mobile Communications (GSM), Code Division Multiple Access (CDMA), integrated Device Enhanced Network (iDEN) standards and the like. These specifications are met using acoustic DSP EQ, gain/loss, and other DSP parameters to shape the acoustic component in the output signal 150.

In T coupling mode, the dominant mode of coupling is magnetic and, in accordance with the invention, the DSP 108 applies magnetic DSP EQ to ensure that the magnetic component of the output signal 150 of the wireless communcations device 100 is sufficient for coupling with the hearing aid. The wireless communications device 100 preferably complies with magnetic sensitivity and frequency response specifications. These specifications may be as defined in the American National Standards Institute (ANSI) C63.19 standard. For instance, a flat magnetic response will satisfy this specification. This specification is met by using magnetic DSP EQ, gain/loss, and other DSP parameters.

The magnetic response of the speaker is typically relatively flat throughout the telephony frequency range. However, the magnetic response may be tailored to meet the individual user's hearing loss profile or to account for anything that might make it not flat. Further, a different magnetic DSP EQ may be needed as a function of volume control in T mode as currently happens in M mode. U.S. patent application Ser. No. 10/855,407 filed on May 28, 2004 describes varying the DSP EQ parameters as a function of volume for M coupling mode. However, this same concept can be applied to the present invention when the device is operating in T or M/T coupling modes. In T coupling mode, care should be employed in heeding to the maximum drive levels that are permissible based on the power handling capacity of the speaker.

In M/T processing mode, there is both acoustic and magnetic coupling between the wireless communications device 100 and the hearing aid. In this case, the DSP 108 applies acoustic/magnetic DSP EQ to provide a compromise between acoustic and magnetic coupling. The quality of each of the acoustic and magnetic components in the output signal is also determined by the receiver characteristics and the actual acoustic/mechanical implementation. The acoustic/magnetic DSP EQ parameters may be chosen to compromise between the quality of the acoustic and magnetic components in the output signal 150. Alternatively, the acoustic/magnetic DSP EQ parameters may be selected to optimize the magnetic component of the output signal 150 since the acoustic component in this coupling mode is mainly used for listening to sounds of the surrounding environment but not being overwhelmed by them. For example, in M/T coupling mode, using a hearing aid compatible device in a noisy environment like an airport, the user would be aware of what is going on around but would still be able to concentrate on the phone conversation. In fact, the microphone input of the hearing aid may be attenuated to prevent the occurrence of acoustic feedback when the device 100 is placed close to the hearing aid of the device user. However, care should be taken to ensure that audio and magnetic signal distortion is not introduced in this coupling mode of operation.

The actual DSP EQ parameters and gain settings applied when the device 100 is operating in T or M/T coupling mode may change if an additional device telecoil is used in the output stage 124. The additional device coil and the telecoil of the hearing aid may most likely be different. The telecoil of the hearing aid usually has a ferrite core for increased sensitivity since the telecoil itself must be small enough to fit inside the hearing aid. However, the additional device coil may simply be a coil of wire that has enough turns to provide the desired sensitivity.

It should be noted that the wireless communications device 100 may not necessarily meet all of the magnetic specifications in M coupling mode or all of the audio specifications in T coupling mode. However, using separate processing parameters based on the coupling modes makes it possible to optimize for each mode separately. However, volume control may be adjusted in M and T modes the same way.

The coupling setting of the wireless communications device 100 may be set at a default setting or could be selectable each time a call is placed or received. For instance, a user of a hearing aid that uses T input mode might wish to default the output coupling of the wireless communications device 100 to the T or M/T coupling mode. In another instance, a non hard-of-hearing user, or a user of a hearing aid without T or M/T input mode (or one who chooses to not use these input modes), would default to the M coupling mode for the device 100.

The output control algorithm 132 operates in unison with the selection means 120 and the default coupling mode to select appropriate values for the DSP EQ parameters based on the coupling mode that is chosen by the user. Various sets of DSP EQ parameters may be stored in the flash memory 116. In addition, there may be several sets of DSP EQ parameters for each coupling mode of operation. For a given coupling mode of operation, a particular set of DSP EQ parameters may be selected by the output control algorithm based on performance criteria that is specified for one or more of the components of the output signal 150. The particular set of DSP EQ parameters are then provided to the DSP 108 by the control unit 102.

Figure 3:
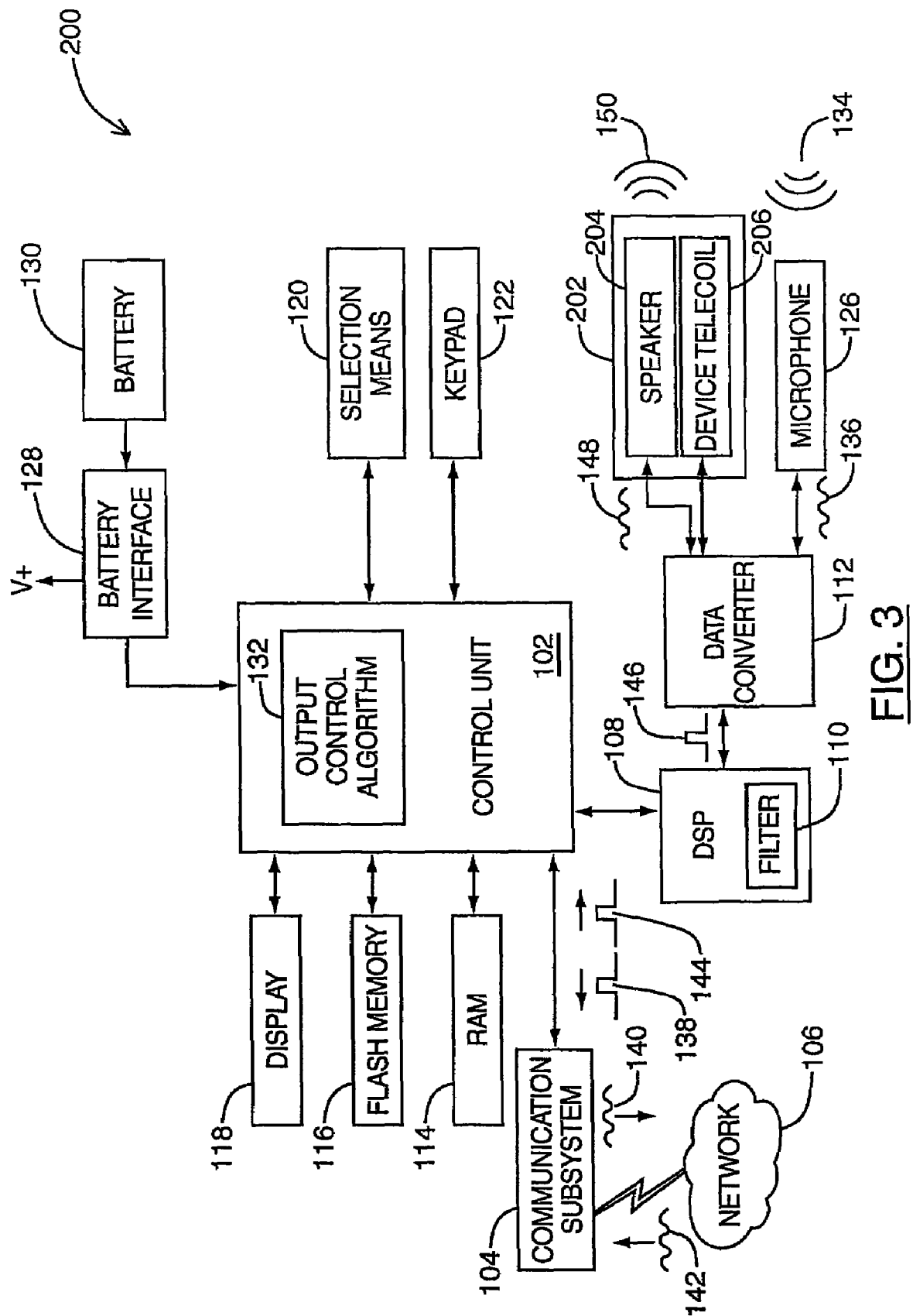
FIG. 3 is a block diagram of an exemplary alternative embodiment of a wireless communications device in accordance with the invention.

Referring now to FIG. 3, shown therein is a block diagram of an exemplary alternative embodiment of a wireless communications device 200 in accordance with the invention. In certain situations, the coil of the speaker in the output stage 124 may be insufficient for generating an appropriate magnetic signal for coupling with the hearing aid of the device user when operating in T or M/T input mode. Manufacturers typically provide specifications for the magnetic strength of a speaker under standard test conditions (i.e. for a certain drive level or output sound pressure level and distance from a magnetic probe). However, this information might not be sufficient since the speaker may be situated further inside the device 100 or closer to the surface of the device 100 than in standard test conditions. Tests are therefore conducted during the design of the device 100 to determine the actual level of the magnetic component in the output signal 150 and the corresponding frequency response. If the speaker turns out to be lacking in magnetic signal level and/or frequency response, then an additional device coil may be added to the output stage.

Accordingly, the wireless communications device 200 includes an output stage 202 having a speaker 204, with a coil (not shown), and an additional telecoil 206. The data converter 112 has two outputs, one output signal for the speaker 204 and one output signal for the telecoil 206. When the coupling for the wireless communications device 100 is specified to be M/T, the drive signal 148 is provided to both the speaker 204 and the telecoil 206. In T mode, the drive signal 148 may be provided to both the speaker 204 and the telecoil 206 if required to boost the level of the magnetic component in the output signal 150. In this case, the processor 108 may provide two processed received signals, one being optimized for use with the speaker 204 using audio DSP parameters and provided to the speaker 204 and the other being optimized for use with the additional device telecoil 206 using magnetic DSP parameters and provided to the additional device telecoil 206. Alternatively, there may be electronic circuit components prior to the speaker 204 or the additional device telecoil 206 for separately optimizing the drive signals that are provided to these components or otherwise altering the acoustic and magnetic components of the output signal 150. In M coupling mode, the drive signal 148 need only be provided to the speaker 204.

In the embodiment shown in FIG. 3, the data converter 112 is capable of providing two separate data outputs. In the event, that the data converter 112 is capable of providing only a single data output, then the device 200 may be modified by including two data converters. Another alternative follows below.

In a further alternative, while still using the same hardware layout specified in FIG. 3, the output stage 202 of the wireless communications device 200 may be driven differently depending on whether the wireless communications device 200 is operating in M, T or M/T coupling mode. In this embodiment 200, the speaker 204 is sufficient, and may be optimised, for generating the acoustic component of the output signal 150 in the M or M/T coupling modes and the additional device telecoil 206 is sufficient, and may be optimized, for generating the magnetic component of the output signal 150 in the T coupling mode. Accordingly, the additional device telecoil 206 may be disabled when the wireless communications device 200 is operating in M or M/T coupling modes and the speaker 204 may be disabled when the wireless communications device 200 is operating in T coupling mode. This allows the wireless communications device 200 to conserve battery power and minimize interference between the two modes (only if each transducer is driven separately).

Figure 4:
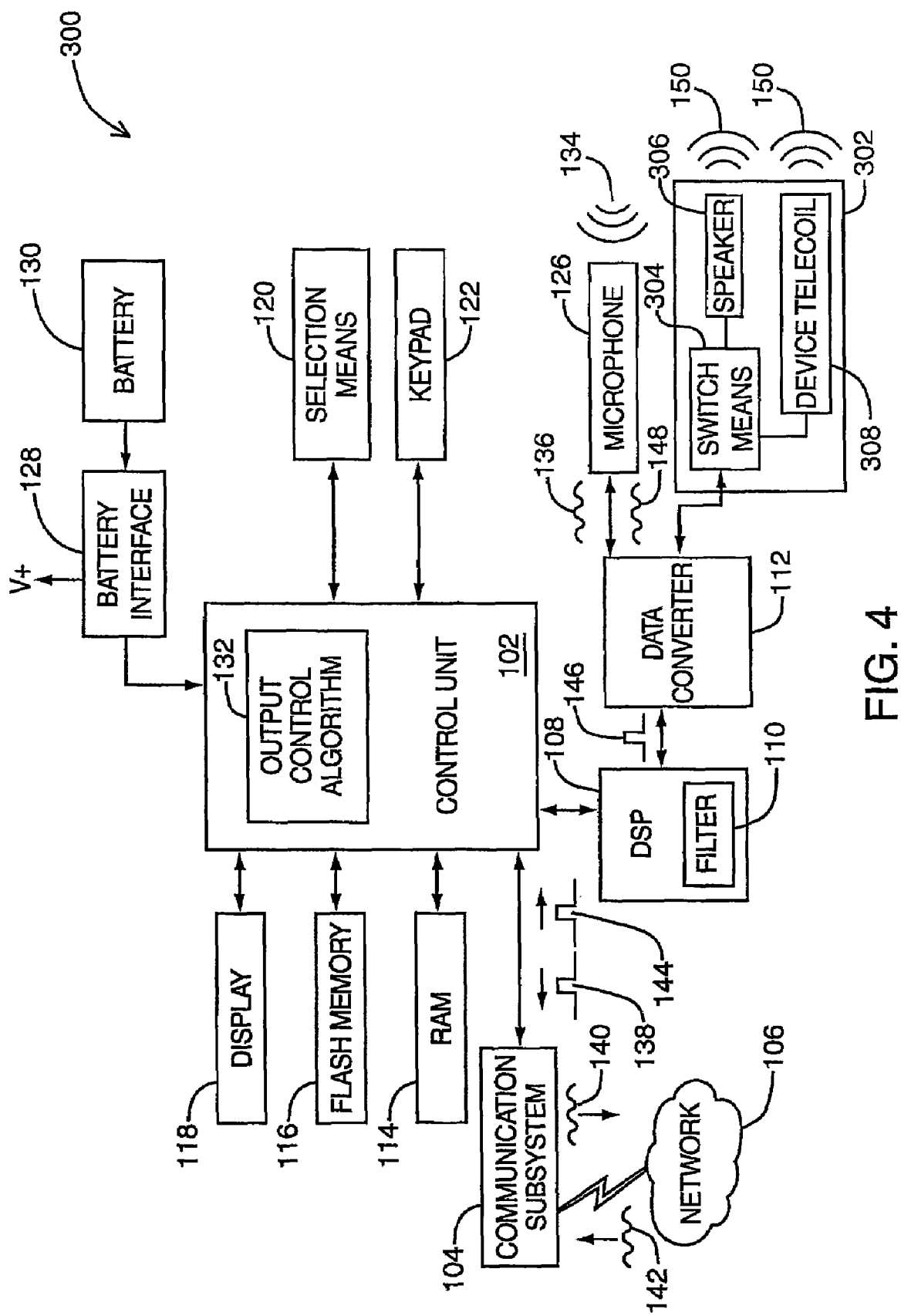
FIG. 4 is a block diagram of another exemplary alternative embodiment of a wireless communications device in accordance with the invention.

Referring now to FIG. 4, shown therein is a block diagram of another exemplary alternative embodiment of a wireless communications device 300 in accordance with the invention. The device 300 includes an output stage 302 having a switch means 304 connected to a speaker 306 and an additional device telecoil 308. The switch means 304 is connected to the data converter 112 and provides three different types of connections. When the device 300 is operating in M coupling mode, the switch means 304 connects the data converter 112 to the speaker 306. When the device 300 is operating in T coupling mode, the switch means 304 connects the data converter 112 to the T-coil 308. When the device 300 is operating in M/T coupling mode, the switch means 304 connects the data converter 112 to the speaker 306 and the additional device telecoil 308. This embodiment is useful when the data converter 112 only provides one data output channel.

As with the embodiment shown in FIG. 3, when both the speaker 306 and the additional device coil 308 are driven, the processor 108 may provide two processed received signals, one being optimized for use with the speaker 306 using audio DSP parameters and provided to the speaker 306 and the other being optimized for use with the additional device telecoil 308 using magnetic DSP parameters and provided to the additional device telecoil 308.

Figure 5:
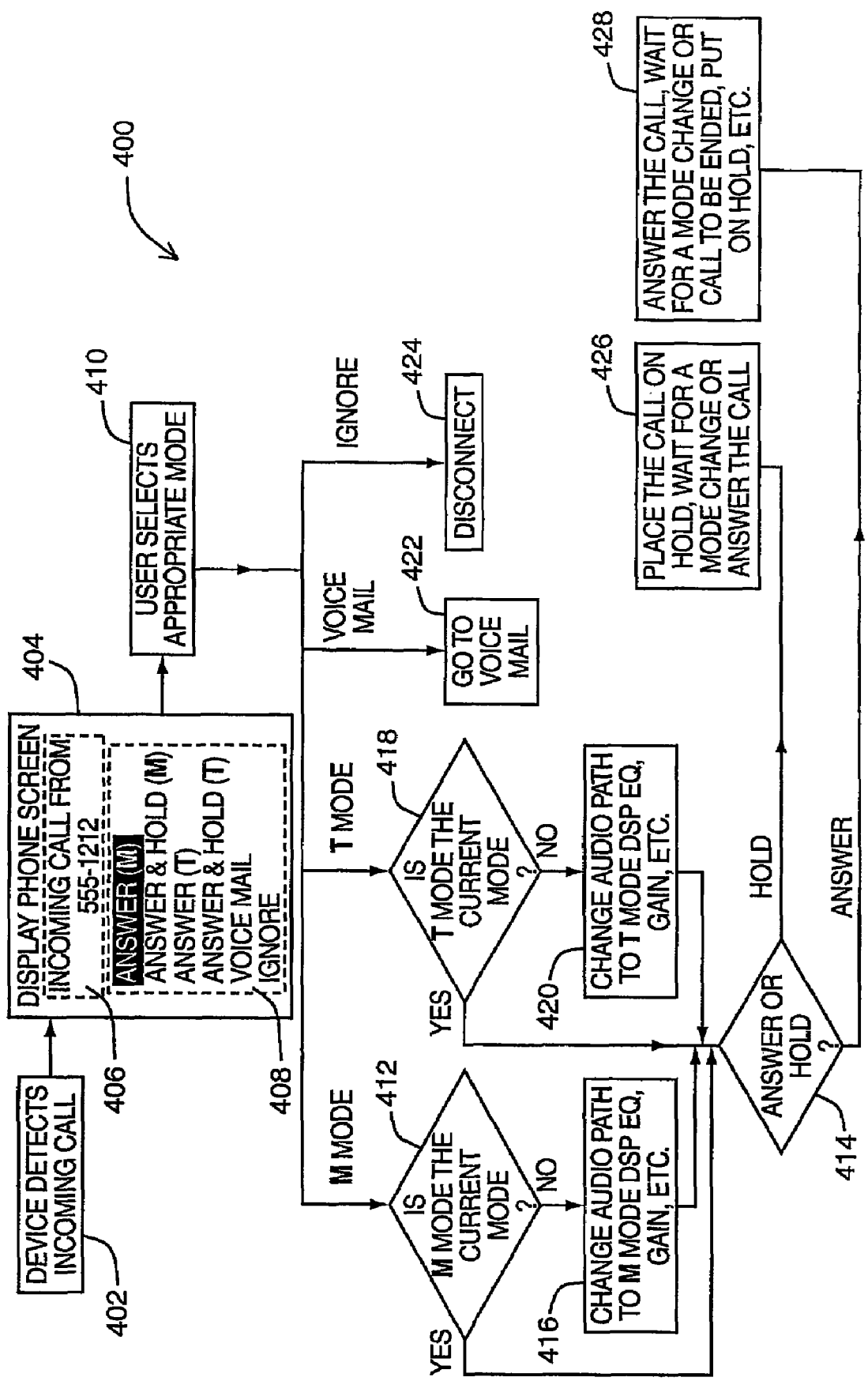
FIG. 5 is a flowchart showing an exemplary process followed by the wireless communications device when the hearing aid user receives a telephone call; and, FIG. 6 is a flowchart showing an exemplary process followed by the wireless communications device when the hearing aid user makes a telephone call.

Referring now to FIG. 5, shown therein is a flowchart of an exemplary process 400 followed by the wireless communications devices of the invention when the device user receives a telephone call. In the first step 402, the wireless communications device detects an incoming phone call. In the next step 404, the device posts a message on the display 118. The message may have a first field 406 indicating that there is an incoming call and the phone number of the user who is calling. In this exemplary embodiment, the message also includes a second field 408 indicating alternative options that the user may select. In this example, the user may answer the phone call while the device is operating in M coupling mode, answer the phone call while the device is operating in M coupling mode and place the call on hold, answer the phone call while the device is operating in T coupling mode, answer the phone call while the device is operating in T coupling mode and place the call on hold, let the call go to voice mail or ignore the call. Similar options may be available for dealing with the phone call while the device is operating in M/T coupling mode but are not shown here to simplify the description. The default mode of operation may be previously specified and shown in shaded form in the field 408 of the display 118. In this example, the default mode is used to answer the phone call while the device is operating in M coupling mode. In step 410, the user selects the appropriate mode if no default mode has been specified.

If the user selected an M coupling mode option, then the process 400 moves to step 412 in which the device is checked to see if it is operating in M coupling mode. If the device is operating in M coupling mode, then the process 400 moves to step 414 in which it is determined whether the call is to be answered or put on hold. If the device is not operating in M coupling mode, then the process 400 moves to step 416 in which the device is switched to M coupling mode and the appropriate parameters are used by the DSP 108. The process then moves to step 414.

If the user selected a T coupling mode option, then the process 400 moves to step 418 in which the device is checked to see if it is operating in T coupling mode. If the device is operating in T coupling mode, then the process 400 moves to step 414. If the device is not operating in T coupling mode, then the process 400 moves to step 420 in which the device is switched to T coupling mode and the appropriate parameters are used by the DSP 108. The process then moves to step 414.

If the user selected the "voice mail" option, then the process 400 moves to step 422 in which the device call is routed to voice mail. If the user selected the ignore option, then the process 400 moves to step 424 in which the call is disconnected.

In step 414, if the user had selected to place the call on hold, then the process 400 moves to step 426 in which the call is placed on hold and the device waits for a coupling mode change, or for the user to answer the call. In step 414, if the user had selected to answer the call, then the process 400 moves to step 428 in which the user answers the call and the device waits for the call to end, for a coupling mode change, for the call to be put on hold, etc.

Figure 6:
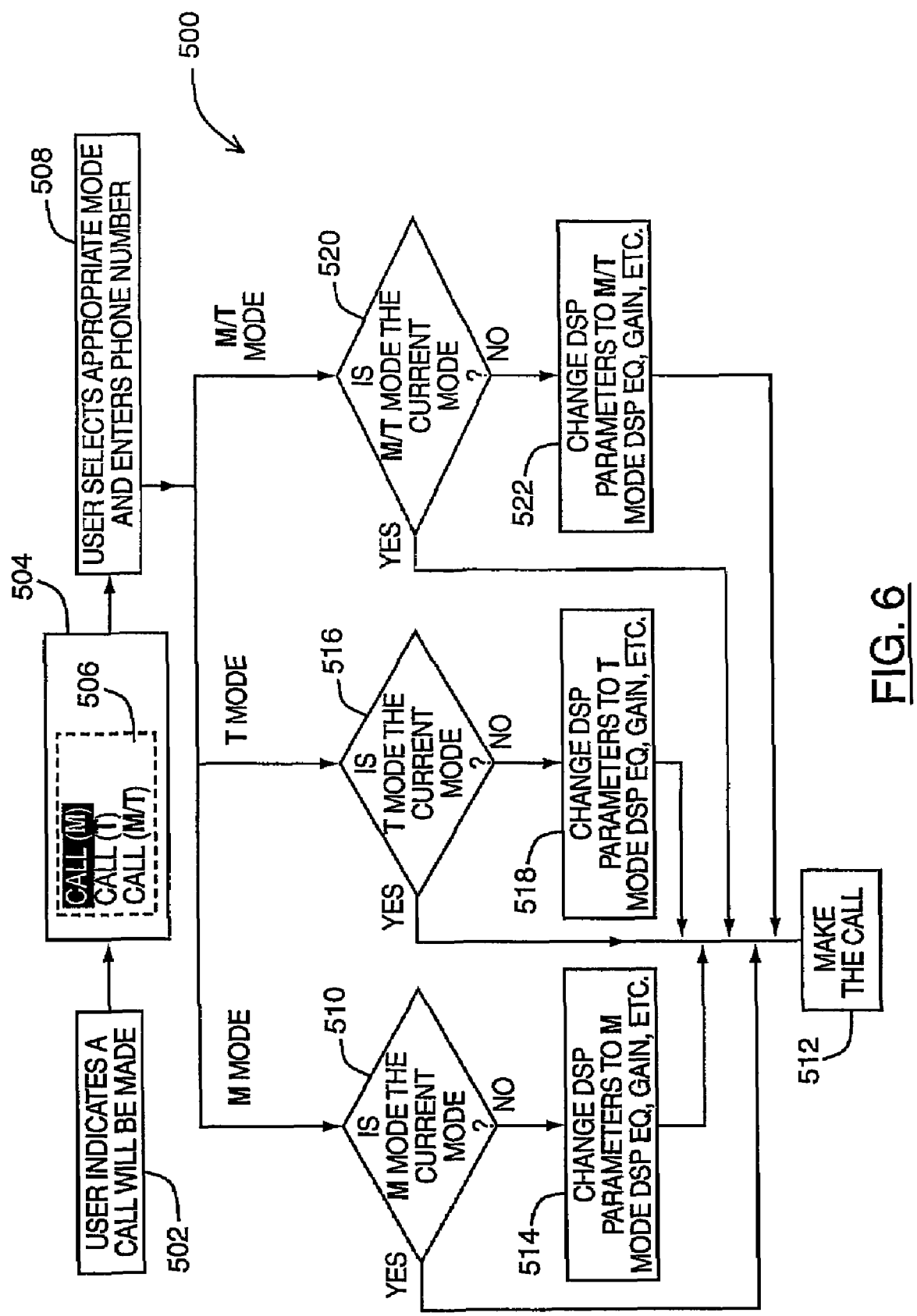

Referring now to FIG. 6, shown therein is a flowchart of an exemplary process 500 followed by the wireless communications devices of the invention when the device user makes a telephone call. In step 502, the user indicates to the device that a call will be made. In step 504, the device displays the different coupling modes in a field 506 on the display 118. The device displays several options: call while the device is operating in M coupling mode, call while the device is operating in T coupling mode or call while the device is operating in M/T coupling mode. Once again, the default mode is shaded. In step 508, the user makes a selection and enters the phone number to be called or selects the phone number to be called using a suitable means such as directory lookup, redial, speed dial, for example, that is well known to those skilled in the art.

If the user chooses to place the call while the device is operating in M mode, the process 500 moves to step 510 where the device checks to see if the current mode of operation is M coupling mode. If the device is operating in M coupling mode, then the process 500 moves to step 512 in which the device makes the call. If the device is not operating in M coupling mode, then the process 500 moves to step 514 in which the device is switched to M coupling mode and the appropriate parameters are used by the DSP 108. The process then moves to step 512.

If the user chooses to place the call while the device is operating in T coupling mode, the process 500 moves to step 516 where the device checks to see if the current mode of operation is T mode. If the device is operating in T coupling mode, then the process 500 moves to step 512 in which the device makes the call. If the device is not operating in T coupling mode, then the process 500 moves to step 518 in which the device is switched to T coupling mode and the appropriate parameters are used by the DSP 108. The process then moves to step 512.

If the user chooses to place the call while the device is operating in M/T coupling mode, the process 500 moves to step 520 where the device checks to see if the current mode of operation is M/T coupling mode. If the device is operating in M/T coupling mode, then the process 500 moves to step 512 in which the device makes the call. If the device is not operating in M/T coupling mode, then the process 500 moves to step 522 in which the device is switched to M/T coupling mode and the appropriate parameters are used by the DSP 108. The process then moves to step 512.

It should be understood that various modifications can be made to the embodiments described and illustrated herein, without departing from the invention. Further, it should be understood that the invention does not require all of the components shown herein and that some of these components have been included to further describe the additional functionality that the device may provide besides simply making and answering calls. In other cases, additional components may be added to the device such as a serial port to allow the user to set preferences through an external device or software application. A short-range communications subsystem may also be included for providing communication between the device and different systems or devices, without the use of the network 106. An auxiliary subsystem may also be included for auxiliary input devices such as: a touch screen, a mouse, a track ball, an infrared fingerprint detector, or a roller wheel with dynamic button pressing capability, for example.

Furthermore, the data converter and output stages may be combined by using "digital ready" transducers that have digital-to-analog and analog-to-digital functionality. Such a device may receive a digital signal, convert it to an analog signal and provide it to the appropriate component in the output stage to produce acoustic or magnetic components in the output signal. In addition, the device may receive an analog signal from a microphone, convert it to a digital signal and provide the digital signal to the DSP for further processing.

The invention claimed is:

1. A wireless communications device for receiving a wireless speech signal and providing at least one output signal, the device comprising:
   a) a control unit for controlling the operation of the wireless communications device;
   b) a selection means connected to the control unit and configured to allow selection from at least three output coupling modes, the at least three output coupling modes comprising a microphone mode, a telecoil mode, and a microphone/telecoil mode, each of the at least three output coupling modes for generating one of the at least one output signal of the device;
   c) a communication subsystem connected to the control unit for receiving the wireless speech signal and producing a received signal;
   d) a processor connected to the control unit for receiving the received signal and producing at least one processed received signal, the processor using parameters to generate the at least one processed received signal according to a selected mode from the at least three output coupling modes; and,
   e) an output stage comprising a speaker with a coil, and further comprising an additional device telecoil, the output stage configured to generate the at least one output signal based on the at least one processed received signal
   wherein the at least one processed received signal is provided to the speaker and not to the additional device telecoil when the selected mode comprises the microphone mode;
   wherein the at least one processed received signal is provided to both the speaker and the additional device telecoil when the selected mode comprises the microphone/telecoil mode; and
   wherein the at least three output coupling modes correspond to modes of input operation for a hearing aid to improve coupling between the device and the hearing aid.

2. The device of claim 1, wherein the parameters include acoustic digital signal processing equalization parameters when the selected mode comprises the microphone mode.

3. The device of claim 1, wherein the parameters include magnetic digital signal processing equalization parameters when the selected mode comprises the telecoil mode.

4. The device of claim 1, wherein the parameters include acoustic/magnetic digital signal processing equalization parameters when the selected mode comprises the microphone/telecoil mode.

5. The device of claim 1, wherein the device further comprises a data converter connected to the processor for receiving the at least one processed received signal and producing at least one analog signal; and wherein the output stage is connected to the data converter for receiving the at least one analog signal and producing the at least one output signal.

6. The device of claim 5, wherein the processor generates two processed received signals, one of the two processed received signals being provided to the speaker by the data converter and the other of the two processed received signals being provided to the additional device telecoil by the data converter, and wherein one of the two processed received signals is generated using corresponding to the speaker and the other of the two processed received signals is generated using parameters corresponding to the additional device telecoil.

7. The device of claim 1, wherein the at least one processed received signal is provided to the additional device telecoil when the selected mode comprises telecoil mode.

8. The device of claim 7, wherein the at least one processed received signal is provided to the additional device telecoil and not to the speaker when the selected mode comprises the telecoil mode.

9. A method for receiving a wireless speech signal with a device and providing at least one output signal, the method comprising:
   a) providing of at least three output coupling modes for the device, the at least three output coupling modes comprising a microphone mode, a telecoil mode, and a microphone/telecoil mode, the at least three output coupling modes corresponding to modes of input operation for a hearing aid to improve coupling between the device and the hearing aid;
   b) receiving the wireless speech signal and producing a received signal;
   c) generating at least one processed received signal using parameters selected according to a selected mode from the at least three coupling modes; and,
   d) generating the at least one output signal based on the at least one processed received signal using at least one of a speaker with a coil and an additional device telecoil;
   wherein output is generated by the speaker and not by the additional device telecoil when the selected mode comprises the microphone mode; and
   wherein output is generated by both the sneaker and the additional device telecoil when the selected mode comprises the microphone/telecoil mode.

10. The method of claim 9, wherein the method includes providing acoustic digital signal processing equalization parameters as the parameters when the selected mode is comprises the microphone mode.

11. The method of claim 9, wherein the method includes providing magnetic digital signal processing equalization parameters as the parameters when the selected mode comprises the telecoil mode.

12. The method of claim 9, wherein the method includes providing acoustic/magnetic digital signal processing equalization parameters as the parameters when the selected mode comprises the microphone/telecoil mode.

13. The method of claim 9, wherein comprises:
   e) receiving the at least one processed received signal and producing at least one analog signal; and,
   f) receiving the at least one analog signal and producing the at least one output signal.

14. The method of claim 9, wherein
   c) comprises generating two processed received signals, one of the two processed received signals being provided to the speaker by a data converter and the other of the two processed received signals being provided to the additional device telecoil by the data converter, and wherein one of the two processed received signals is generated using parameters corresponding to one-of the speaker and the other of the two processed received signals is generated using parameters corresponding to the additional device telecoil.

15. The method of claim 9, wherein output is generated by the additional device telecoil when the selected mode comprises the telecoil mode.

16. The method of claim 9, wherein output is generated by the additional device telecoil and not by the speaker when the selected mode comprises the telecoil mode speaker.

* * * * *